United States Patent
Priyadarshi et al.

(10) Patent No.: US 10,551,896 B2
(45) Date of Patent: *Feb. 4, 2020

(54) METHOD AND APPARATUS FOR DYNAMIC CLOCK AND VOLTAGE SCALING IN A COMPUTER PROCESSOR BASED ON PROGRAM PHASE

(71) Applicant: QUALCOMM Incorporated, San Diego, CA (US)

(72) Inventors: Shivam Priyadarshi, Morrisville, NC (US); Anil Krishna, Lakeway, TX (US); Raguram Damodaran, La Jolla, CA (US); Jeffrey Todd Bridges, Raleigh, NC (US); Ryan Wells, Raleigh, NC (US); Norman Gargash, Raleigh, NC (US); Rodney Wayne Smith, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 15/814,361

(22) Filed: Nov. 15, 2017

(65) Prior Publication Data

US 2018/0074568 A1    Mar. 15, 2018

Related U.S. Application Data

(63) Continuation of application No. 14/986,738, filed on Jan. 4, 2016, now Pat. No. 9,851,774.

(51) Int. Cl.
*G06F 1/32* (2019.01)
*G06F 1/3228* (2019.01)
(Continued)

(52) U.S. Cl.
CPC ............ *G06F 1/3228* (2013.01); *G06F 1/324* (2013.01); *G06F 1/3206* (2013.01);
(Continued)

(58) Field of Classification Search
CPC ................. G06F 1/32; G06F 1/26; G06F 9/44
See application file for complete search history.

(56) References Cited

U.S. PATENT DOCUMENTS 6,189,072 B1   2/2001 Levine et al.
7,730,340 B2   6/2010 Hu et al.
(Continued)

FOREIGN PATENT DOCUMENTS

CN   101379453 B    5/2011
CN   102687098 B    6/2015
TW      343297 B   10/1998

OTHER PUBLICATIONS

Taiwan Search Report—TW105141098—TIPO—dated Mar. 7, 2018.
(Continued)

*Primary Examiner* — Jaweed A Abbaszadeh
*Assistant Examiner* — Keshab R Pandey
(74) *Attorney, Agent, or Firm* — Muncy, Geissler, Olds & Lowe

(57) ABSTRACT

The disclosure generally relates to dynamic clock and voltage scaling (DCVS) based on program phase. For example, during each program phase, a first hardware counter may count each cycle where a dispatch stall occurs and an oldest instruction in a load queue is a last-level cache miss, a second hardware counter may count total cycles, and a third hardware counter may count committed instructions. Accordingly, a software/firmware mechanism may read the various hardware counters once the committed instruction counter reaches a threshold value and divide a value of the first hardware counter by a value of the second hardware
(Continued)

counter to measure a stall fraction during a current program execution phase. The measured stall fraction can then be used to predict a stall fraction in a next program execution phase such that optimal voltage and frequency settings can be applied in the next phase based on the predicted stall fraction.

36 Claims, 4 Drawing Sheets

(51) Int. Cl.
G06F 1/3206 (2019.01)
G06F 1/324 (2019.01)
G06F 1/3296 (2019.01)

(52) U.S. Cl.
CPC .......... *G06F 1/3296* (2013.01); *Y02D 10/126* (2018.01); *Y02D 10/172* (2018.01)

(56) References Cited

U.S. PATENT DOCUMENTS

| 7,840,825 | B2 | 11/2010 | Altevogt et al. | |
|---|---|---|---|---|
| 8,812,808 | B2 | 8/2014 | Eyerman et al. | |
| 2008/0235364 | A1 | 9/2008 | Gorbatov et al. | |
| 2009/0210740 | A1* | 8/2009 | Huang | G06F 1/3203 713/502 |
| 2009/0312930 | A1* | 12/2009 | Nakakita | F01D 17/08 701/100 |
| 2011/0093734 | A1 | 4/2011 | Burchard et al. | |
| 2012/0260057 | A1* | 10/2012 | Eyerman | G06F 1/3203 711/167 |
| 2014/0277815 | A1* | 9/2014 | Hanumaiah | G05D 23/19 700/299 |
| 2017/0192484 | A1 | 7/2017 | Priyadarshi et al. | |

OTHER PUBLICATIONS

International Search Report and Written Opinion—PCT/US2016/066099—ISA/EPO—dated Mar. 16, 2017.

Malkowski K., et al., "Phase-aware Adaptive Hardware Selection for Power-efficient Scientific Computations", Low Power Electronics and Design (ISLPED), 2007 ACM/IEEE International Symposium on, IEEE, Piscataway, NJ, USA, Aug. 27, 2007 (Aug. 27, 2007), XP031711253, pp. 403-406.

Sasaki H., et al., "An Intra-Task DVFS Technique based on Statistical Analysis of Hardware Events," CF '07 Proceedings of the 4th international conference on Computing frontiers, ACM, May 7-9, 2007, pp. 123-130.

\* cited by examiner

METHOD AND APPARATUS FOR DYNAMIC CLOCK AND VOLTAGE SCALING IN A COMPUTER PROCESSOR BASED ON PROGRAM PHASE

CROSS-REFERENCE TO RELATED APPLICATIONS

The present application is a continuation of U.S. patent application Ser. No. 14/986,738, entitled "METHOD AND APPARATUS FOR DYNAMIC CLOCK AND VOLTAGE SCALING IN A COMPUTER PROCESSOR BASED ON PROGRAM PHASE," filed Jan. 4, 2016, assigned to the assignee hereof, the contents of which are hereby expressly incorporated by reference in their entirety.

TECHNICAL FIELD

The various aspects and embodiments described herein generally relate to dynamic clock and voltage scaling (DCVS) in a processor-based system, and more particularly, to cooperative hardware and software/firmware mechanisms that can detect and predict an extent to which the processor is waiting on data from a memory subsystem during various program phases and to scale clock frequency and voltage during such program phases accordingly in order to save energy and power.

BACKGROUND

A synchronous digital circuit, such as a central processing unit (CPU) or a digital signal processor (DSP), for example, requires a clock signal to coordinate timing of logic in the circuit. A frequency of the clock signal controls a switching speed or rate of the logic, and thus the performance of the circuit. A relationship exists between a clock frequency of the circuit and a voltage level powering the circuit. An increase in the clock frequency causes a corresponding increase in a minimum voltage level required to power the circuit for proper operation. Accordingly, an increase in clock frequency generally results in increased power consumption. Power consumption of the circuit can be decreased by lowering the voltage level. However, a reduction in voltage level decreases a maximum clock frequency possible for the circuit. The voltage level can be reduced until a minimum threshold voltage level necessary for proper operation of the circuit at a desired clock frequency is reached. To optimize power consumption while still providing acceptable performance, dynamic clock voltage scaling (DCVS) circuits can be employed in processor-based electronic devices, including user-based portable electronic devices. DCVS circuits control clock frequency and voltage level settings by predicting optimal clock frequency and voltage settings for a processor and/or other synchronously clocked components based on performance demands of the electronic device. In this manner, DCVS circuits may optimize power consumption required for a demanded performance level. Further information such as temperature, battery level, and operating system scheduler state can also be used to influence the manner in which DCVS circuits operate.

However, existing techniques that use operating system scheduler states to make DCVS decisions tend to fall short in the ability to account for significant variations in program runtime characteristics. For example, programs generally display two types of phase behaviors: (i) memory intensive phases and (ii) compute intensive phases. In memory intensive phases, the processor waiting on data from the memory subsystem tends to dominate execution time, whereas the processor is typically active during compute intensive phases and utilizing the available processor (non-memory-subsystem) resources to maximize computation. In general, the duration of the memory intensive phases and the compute intensive phases depends upon program characteristics. In some workloads, there can be a long memory bound phase where the processor is primarily waiting for the data and sitting idle. In such phases, voltage and clock frequency can be scaled down to reduce power and energy consumption. However, in most known processors, the operating system software typically makes decisions about whether and/or when to reduce voltage and frequency on a very coarse time granularity. For example, to make DCVS decisions, operating systems typically sample processor activity in the range of every tens to hundreds of milliseconds. From the operating system perspective, during program phases that last a smaller duration than the operating system sampling window, the processor is assumed to be active and doing useful work even if the processor is actually waiting on data to be retrieved from the memory subsystem. Accordingly, in reality, there may be pockets of opportunity to optimize power consumption without compromising performance where the processor is not active. The operating system tends to miss these power and energy saving opportunities and therefore cannot provide fine-grained DCVS control due to having a limited resolution in terms of reaction time as well as lacking visibility into hardware behavior (e.g., when the processor is stalled due to a last-level cache miss, the processor appears to be active and doing useful work from the operating system perspective).

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, a cooperative hardware and software/firmware mechanism may be provided to detect program phases in which a processor is waiting on data from a memory subsystem and predict memory-boundedness in upcoming program phases such that dynamic clock and voltage scaling (DCVS) settings can be applied in the upcoming program phases in order to save energy and power during memory-bound program phases and optimize performance during compute-intensive program phases. For example, according to various aspects, any particular workload may have memory intensive phases that can last from one to ten milliseconds (ms), during which time the processor may be stalled and waiting on data from a memory subsystem for a significant fraction of that time. As such, because circuit technologies have advanced sufficiently to permit scaling voltage and frequency in granularities from 1 ms to 10 ms with minimal overhead, the various aspects and embodiments described herein may advantageously scale voltage and frequency in such memory-bound phases to save power and energy while applying different voltage and frequency settings to optimize performance during compute-intensive phases. In particular, as described in further detail herein, the various aspects and embodiments described herein may utilize a hardware mechanism that has visibility into underlying hardware behavior and can provide information useful to detecting memory-bound and/or compute-intensive program phases and a software/firmware mechanism that can utilize the information obtained via the hardware mechanism to predict a degree to which upcoming program phases are likely to be memory-bound according to computed memory-boundedness in preceding program phases. As such, the software/firmware mechanism may then map the predicted memory-boundedness to optimal voltage and frequency settings.

According to various aspects, as mentioned above, the cooperative hardware and software/firmware mechanism used to scale voltage and frequency in a processor-based system may comprise a hardware mechanism that has visibility into underlying hardware behavior that can provide useful information to indicate the degree to which a current program phase is memory-bound and/or compute-intensive. More particularly, according to various aspects, the hardware mechanism may comprise one or more hardware counters configured to track statistics that can be used to compute the degree to which a current program phase is memory-bound and/or compute-intensive. For example, according to various aspects, the one or more hardware counters may comprise a first hardware counter that may be incremented whenever certain predefined conditions are met in a particular processor cycle, wherein the predefined conditions may be satisfied in each cycle where no instruction is dispatched to the execution lanes (i.e., the cycle includes a "dispatch stall") and an oldest instruction in a load queue is a last-level cache (LLC) miss. Furthermore, in various embodiments, the oldest instruction in the load queue can be in a LLC miss state for multiple cycles while waiting on data to be retrieved from the memory subsystem, whereby the first hardware counter may count each cycle during which the oldest instruction in the load queue is in the LLC miss state and there is no dispatch. In addition, according to various aspects, the hardware counters may comprise a second hardware counter that counts processor cycles and a third hardware counter that counts committed instructions.

According to various aspects, the software/firmware mechanism to scale voltage and frequency settings in the processor-based system may be configured to periodically read the committed instruction counter and further read the other two counters when a value read from the committed instruction counter reaches a threshold value, at which time each hardware counter may be reset to zero. The software/firmware may then divide the value read from the first counter by the value read from the second counter to compute the percentage of the total cycles in which a dispatch stall occurred and the oldest instruction in the load queue was in a last-level cache miss state, which may indicate the degree to which the most recent execution phase was memory-bound. The software/firmware mechanism may then predict the memory-boundedness in the upcoming phases based on an exponential weighted moving average based on the actual memory-boundedness computed in prior phases, which may be mapped to clock frequency and voltage settings that maximizes power savings and minimizes performance loss at the predicted memory-boundedness value and the clock frequency and voltage settings may then be adjusted accordingly.

According to various aspects, an apparatus for dynamic clock and voltage scaling may comprise a first hardware counter configured to count, during a current program execution phase, each cycle in which a dispatch stall occurs and an oldest instruction in a load queue is a last-level cache miss, a second hardware counter configured to count a total number of cycles in the current program execution phase, a third hardware counter configured to count committed instructions, and a processor configured to read the first hardware counter and the second hardware counter in response to the third hardware counter reaching a threshold value, measure a stall fraction during the current program execution phase, wherein the measured stall fraction comprises a first value read from the first hardware counter during the current program execution phase divided by a second value read from the second hardware counter during the current program execution phase, predict a stall fraction in a next program execution phase based on the measured stall fraction during the current program execution phase and a predicted stall fraction for the current program execution phase, and invoke a DCVS module to apply a frequency setting and a voltage setting during the next program execution phase based on the predicted stall fraction in the next program execution phase.

According to various aspects, an apparatus may comprise means for counting, during a current program execution phase, a number of cycles in which a dispatch stall occurs and an oldest instruction in a load queue is a last-level cache miss, means for measuring a stall fraction during the current program execution phase, wherein the measured stall fraction comprises the number of cycles during the current program execution phase in which a dispatch stall occurred and the oldest instruction in the load queue was a last-level cache miss divided by total cycles counted in the current program execution phase, means for predicting a stall fraction in a next program execution phase based on the measured stall fraction during the current program execution phase and a predicted stall fraction for the current program execution phase, and means for invoking a DCVS module to apply a frequency setting and a voltage setting during the next program execution phase based on the predicted stall fraction in the next program execution phase.

According to various aspects, a method for dynamic clock and voltage scaling, may comprise counting, during a current program execution phase, a number of cycles in which a dispatch stall occurs and an oldest instruction in a load queue is a last-level cache miss, measuring a stall fraction during the current program execution phase, wherein measuring the stall fraction comprises dividing the number of cycles during the current program execution phase in which a dispatch stall occurred and the oldest instruction in the load queue was a last-level cache miss by total cycles counted in the current program execution phase, predicting a stall fraction in a next program execution phase based on the measured stall fraction during the current program execution phase and a predicted stall fraction for the current program execution phase, and invoking a DCVS module to apply a frequency setting and a voltage setting during the next program execution phase based on the predicted stall fraction in the next program execution phase.

According to various aspects, a computer-readable storage medium may comprise code for causing a processor to count, during a current program execution phase, a number of cycles in which a dispatch stall occurs and an oldest instruction in a load queue is a last-level cache miss, measure a stall fraction during the current program execution phase, wherein measuring the stall fraction comprises dividing the number of cycles during the current program execution phase in which a dispatch stall occurred and the oldest instruction in the load queue was a last-level cache miss by total cycles counted in the current program execution phase, predict a stall fraction in a next program execution phase based on the measured stall fraction during the current program execution phase and a predicted stall fraction for the current program execution phase, and invoke a DCVS module to apply a frequency setting and a voltage setting during the next program execution phase based on the predicted stall fraction in the next program execution phase.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
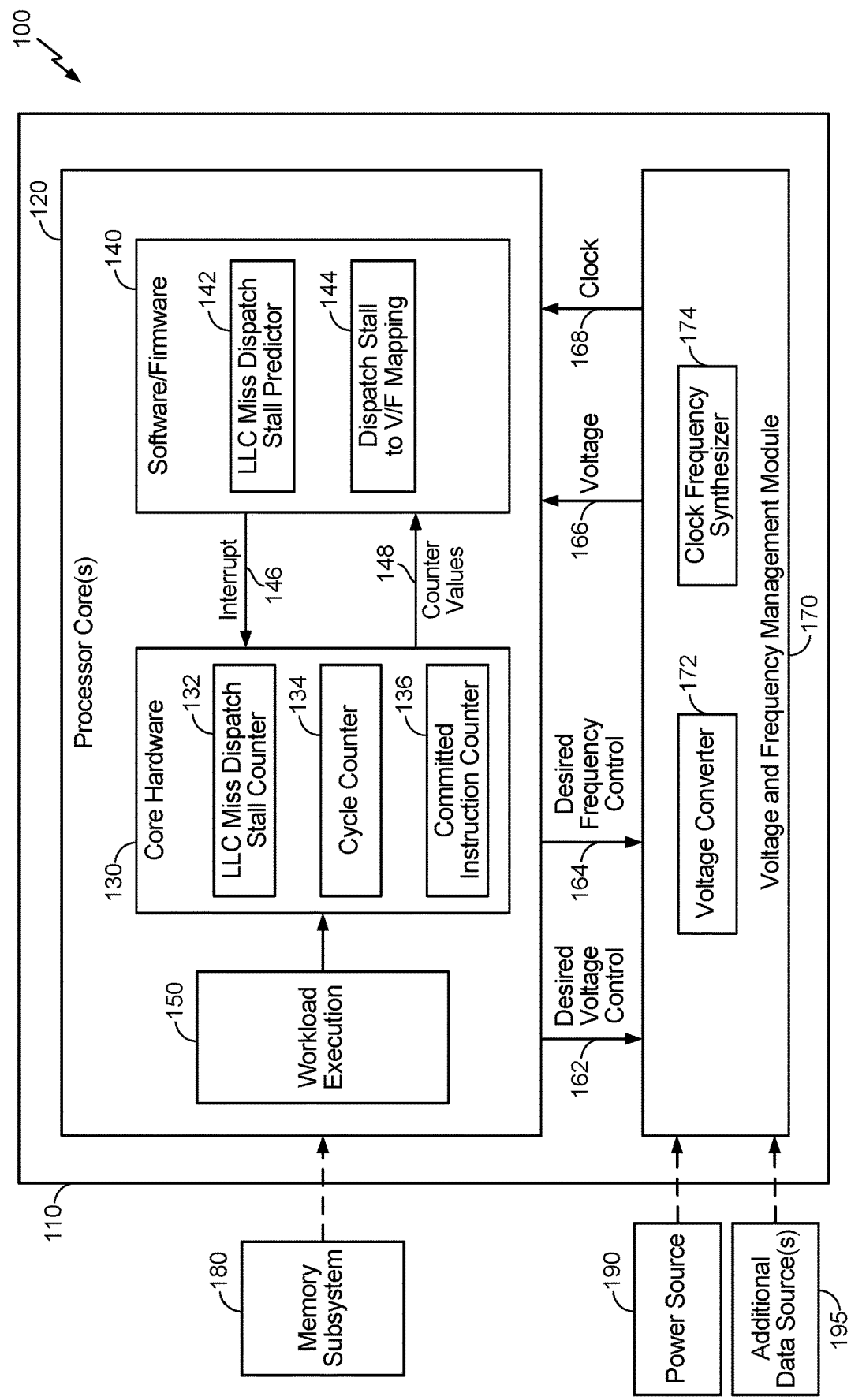
FIG. 1 illustrates an exemplary architecture that can implement dynamic clock and voltage scaling (DCVS) in a processor-based system according to a cooperative hardware and software/firmware mechanism that can detect and predict memory-bound and compute-intensive program execution phases, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

According to various aspects, a cooperative hardware and software/firmware mechanism can be used to detect program phases in which a processor is waiting on data from a memory subsystem and predict memory-boundedness in upcoming program phases such that dynamic clock and voltage scaling (DCVS) settings can be applied in the upcoming program phases in order to save energy and power during memory-bound program phases and optimize performance during compute-intensive program phases. Furthermore, related methods and processor-based systems are also disclosed. For example, according to various aspects, any particular workload may have memory intensive phases that can last from one to ten milliseconds (ms), during which time the processor may be stalled and waiting on data from a memory subsystem. Accordingly, because circuit technologies have advanced sufficiently to permit applying DCVS functionality in granularities from 1 ms to 10 ms with minimal overhead, the cooperative hardware and software/firmware mechanism disclosed herein may advantageously scale voltage and frequency in such memory-bound phases to save power and energy while applying different voltage and frequency settings to optimize performance during compute-intensive phases. More particularly, as will be described in further detail herein, the hardware mechanism may have visibility into underlying hardware behavior and can therefore provide information that can be used to detect memory-bound and/or compute-intensive program phases, while the software/firmware mechanism can be configured to utilize the information obtained via the hardware mechanism to predict a degree to which one or more upcoming program phases are likely to be memory-bound and/or compute-intensive according to actual memory-boundedness computed in one or more preceding program phases. As such, the software/firmware mechanism may then map the predicted memory-boundedness to optimal voltage and frequency settings.

According to various aspects, FIG. 1 illustrates an exemplary architecture that can implement dynamic clock and voltage scaling (DCVS) in a processor-based system 100 using a cooperative hardware and software/firmware mechanism that can detect and predict memory-bound and compute-intensive program execution phases. In various embodiments, the processor-based system 100 may comprise a processor 110 (or central processing unit (CPU)) that includes one or more processor cores 120 in addition to a voltage and frequency management module 170. In various embodiments, the processor 110 may be integrated on a semiconductor die or package (not shown) and the processor core(s) 120 may further include a workload execution module 150, which may encompass one or more digital logic elements, semiconductor circuits, memory structures (e.g., a cache), among other elements. Furthermore, although not explicitly shown in FIG. 1, the workload execution module 150 may include a load queue, an instruction cache, a data cache, a pipeline configured to fetch instructions (e.g., load instructions or store instructions) from the instruction cache and/or the load queue and access the data cache to execute the fetched instructions, and one or more functional blocks configured to perform one or more workloads. According to various aspects, the processor-based system 100 may further include a memory subsystem 180, which may generally represent off-chip memory that may include system memory, caches at a higher level than any cache on the processor 110 (i.e., caches beyond a "last-level cache" (LLC) accessible on the processor 110), any other system memory components that may include volatile and/or non-volatile memory, and/or combinations thereof.

According to various aspects, the processor 110 (and specifically the voltage and frequency management module 170) may be connected to a power source 190, which may supply voltage to a voltage converter 172 in the voltage and frequency management module 170. The voltage converter 172 in turn converts the voltage supplied from the power source 190 into an appropriate voltage to power the processor core(s) 120, as shown at 166. In various embodiments, the voltage 166 output from the voltage converter 172 may be determined to meet minimum voltage value requirements at the processor core(s) 120. For example, one method to determine the minimum voltage requirements at the processor core(s) 120 may be based on a minimum voltage required to support a specified clock frequency at the processor core(s) 120. Furthermore, according to various aspects, the voltage and frequency management module 170 may comprise a clock frequency synthesizer 174 configured to supply one or more clock pulses at specified clock frequencies to the processor core(s) 120 to execute computational tasks, as shown at 168. For example, in various embodiments, the clock frequency at which the clock frequency synthesizer 174 supplies the one or more clock pulses may be based on an external reference clock source (not shown), such as a front side bus (FSB) clock, wherein the clock frequency synthesizer 174 may multiply the reference clock source according to a given multiplier to determine the clock frequency at which to supply the one or more clock pulses. Alternatively, in various embodiments, the clock frequency synthesizer 174 may generate the one or more clock pulses in an independent manner without utilizing any other internal and/or external clock sources. In any case, the clock frequency synthesizer 174 may modify the clock frequency to supply the clock pulses to the processor core(s) 120 at a lower or higher clock frequency, wherein a maximum clock frequency at which the clock pulses are supplied to the processor core(s) 120 may depend upon the voltage 166 that the voltage converter 172 supplies to the processor core(s) 120 (e.g., a higher supply voltage 166 may support a higher maximum clock frequency and vice versa).

In various embodiments, the processor core(s) 120 may include core hardware 130 and software/firmware 140 that can cooperate with one another to optimize power consumption at the processor 110 while maintaining acceptable performance levels. For example, in various embodiments, the core hardware 130 and software/firmware 140 can detect and predict memory-bound program phases in which the workload execution module 150 is and/or will likely be waiting on data from the memory subsystem 180 and communicate with the voltage and frequency management module 170 to lower the voltage 166 and clock frequency 168 supplied to the processor core(s) 120 in order to reduce energy consumed from the power source 190 during such memory-bound program phases. Furthermore, in various embodiments, the core hardware 130 and software/firmware 140 can detect and predict compute-intensive program phases in which the workload execution module 150 is and/or will likely be performing useful work, wherein the processor core(s) 120 may communicate with the voltage and frequency management module 170 to increase the voltage 166 and the clock frequency 168 supplied to the processor core(s) 120 to optimize performance during such compute-intensive program phases, as shown in FIG. 1 where the processor core(s) send a desired voltage control signal 162 and a desired frequency control signal 164 to the voltage and frequency management module 170. Furthermore, in various embodiments, the voltage and frequency management module 170 may consider additional data sources 195 such as temperature, operating system (OS) scheduler states, and battery level to determine the optimal settings for the voltage 166 and the clock frequency 168 during any program execution phase. As such, in various embodiments, the voltage and frequency management module 170 may generate control signals to the voltage converter 172 and the clock frequency synthesizer 174 based on the additional data sources 195 in combination with the desired voltage control signal 162 and the desired frequency control signal 164 received from the processor core(s) 120 such that the voltage converter 172 and the clock frequency synthesizer 174 respectively determine the optimal settings for the voltage 166 and the clock frequency 168 based thereon.

According to various aspects, as mentioned above, the cooperative hardware and software/firmware mechanism used to scale voltage and frequency in the processor-based system 100 may comprise the core hardware 130 that has visibility into hardware behavior and can therefore provide useful information to indicate the degree to which a current program phase is memory-bound and/or compute-intensive. For example, as shown in FIG. 1, the core hardware 130 may comprise one or more hardware counters configured to track statistics that can be used to compute the degree to which a current program phase is memory-bound and/or compute-intensive. In particular, the hardware counters may comprise a last-level cache (LLC) miss dispatch stall counter 132, which may be incremented whenever certain predefined conditions are met in a particular processor cycle. For example, in various embodiments, the predefined conditions to increment the LLC miss dispatch stall counter 132 may include (i) no instruction being dispatched to the execution lanes associated with the workload execution module 150 in the particular cycle (i.e., the cycle includes a "dispatch stall") and (ii) an oldest instruction in the load queue is in a LLC miss state. Furthermore, in various embodiments, the oldest instruction in the load queue can be in a LLC miss state for multiple cycles (e.g., hundreds of cycles) until data comes back from the memory subsystem 180, whereby the LLC miss dispatch stall counter 132 may count each cycle during which the oldest instruction in the load queue is in the LLC miss state and there is no dispatch. As such, the LLC miss dispatch stall counter 132 would not be incremented during cycles in which the workload execution module 150 is doing useful work in the presence of a LLC miss (e.g., the LLC miss dispatch stall counter 132 is not incremented in cycles where an instruction is dispatched even if the oldest instruction in the load queue is a LLC miss). Relatedly, the LLC miss dispatch stall counter 132 is not incremented during cycles in which the oldest instruction in the load queue is not a LLC miss even if no dispatch occurs during such cycles. In addition, as shown in FIG. 1, the hardware counters may comprise a cycle counter 134 incremented in every processor cycle to count total processor cycles and a committed instruction counter 136 that counts how many instructions have been committed (or "retired").

According to various aspects, the software/firmware 140 used to scale the voltage and frequency settings in the processor-based system 100 may be configured to read the committed instruction counter 136 according to a suitable polling interval, which may comprise every cycle, on a periodic basis, and/or other suitable criteria to configure the polling interval. In particular, as shown in FIG. 1, the software/firmware 140 may read a value associated with the committed instruction counter 136 via a line 148 coupled between the software/firmware 140 and the core hardware 130, wherein the committed instruction counter 136 may be incremented each time an instruction is committed to configure the polling interval used at the software/firmware 140. For example, in response to the value read from committed instruction counter 136 via the line 148 reaching a threshold value (e.g., ten million or another suitable value), the software/firmware 140 may assert an interrupt line 146 and further read the LLC miss dispatch stall counter 132 and the cycle counter 134 via the line 148, at which time the three hardware counters 132, 134, 136 are each reset to zero. In various embodiments, the software/firmware 140 may then divide the value read from the LLC miss dispatch stall counter 132 by the value read from the cycle counter 134 to compute a percentage of the total cycles in which a dispatch stall occurred in the presence of the oldest instruction in the load queue being a LLC miss. As such, the computed percentage may indicate the degree to which the most recent program phase was memory-bound (e.g., a stall fraction based on the LLC miss dispatch stalls over the total cycles required to commit or otherwise retire N instructions, where N represents the threshold value that triggers reading the LLC miss dispatch stall counter 132 and the cycle counter 134). Accordingly, the software/firmware 140 may comprise a LLC miss dispatch stall predictor 142, which may predict the stall fraction in a next (upcoming) phase based on an exponential weighted moving average based on the stall fraction(s) computed in prior phases. For example, in various embodiments, the predicted stall fraction in the next phase ($PredStall_{n+1}$) may be calculated according to the following formula:

$$PredStall_{n+1} = \alpha * Stall_n + (1-\alpha) * PredStall_n,$$

where $\alpha$ is a programmable and empirically determined constant, $Stall_n$ is an actual stall fraction computed in the current program phase (i.e., the most recent phase to commit or otherwise retire N instructions), and $PredStall_n$ is the stall fraction that was predicted for the current phase in the phase immediately prior to the current phase.

According to various aspects, in response to the LLC miss dispatch stall predictor 142 determining the predicted stall fraction in the next upcoming program phase, the software/firmware 140 may refer to a dispatch stall to voltage and frequency mapping 144 to determine the optimal clock frequency and voltage setting that best maximizes power savings and minimizes performance loss at the predicted stall fraction. The desired voltage control signal 162 and the desired frequency control signal 164 mapped to the predicted stall fraction may then be communicated to the voltage and frequency management module 170. As such, in various embodiments, the voltage converter 172 may then adjust the voltage 166 supplied to the processor core(s) 120 based at least in part on the desired voltage control signal 162, and the clock frequency synthesizer 174 may similarly adjust the clock frequency at which clock pulses 168 are supplied to the processor core(s) 120 based at least in part on the desired frequency control signal 164. For example, in various embodiments, the predicted stall fraction may be compared to various thresholds that each correspond to a voltage and frequency setting, wherein the thresholds may be programmed in the software/firmware 140 and have values based on extensive design space exploration with the goal to maximize power saving with minimal performance loss. Furthermore, the computed and predicted stall fractions may interpreted in a frequency sensitive manner because the LLC miss latency may be measured according to core cycles and depend upon core frequency. As such, while operating in a phase where the supplied frequency 168 differs from a maximum frequency supported at the processor core(s) 120, the predicted stall fraction in the next phase may first be translated to a value that would have existed in the event that the processor core(s) 120 was operating at the maximum supported frequency and the translated value may then be compared with the appropriate threshold(s) provided in the dispatch stall to voltage and frequency mapping 144. Alternatively, according to various embodiments, the threshold(s) can be translated in a frequency dependent manner to account for differences between the operating frequency and the maximum frequency in a given program phase.

Figure 2:
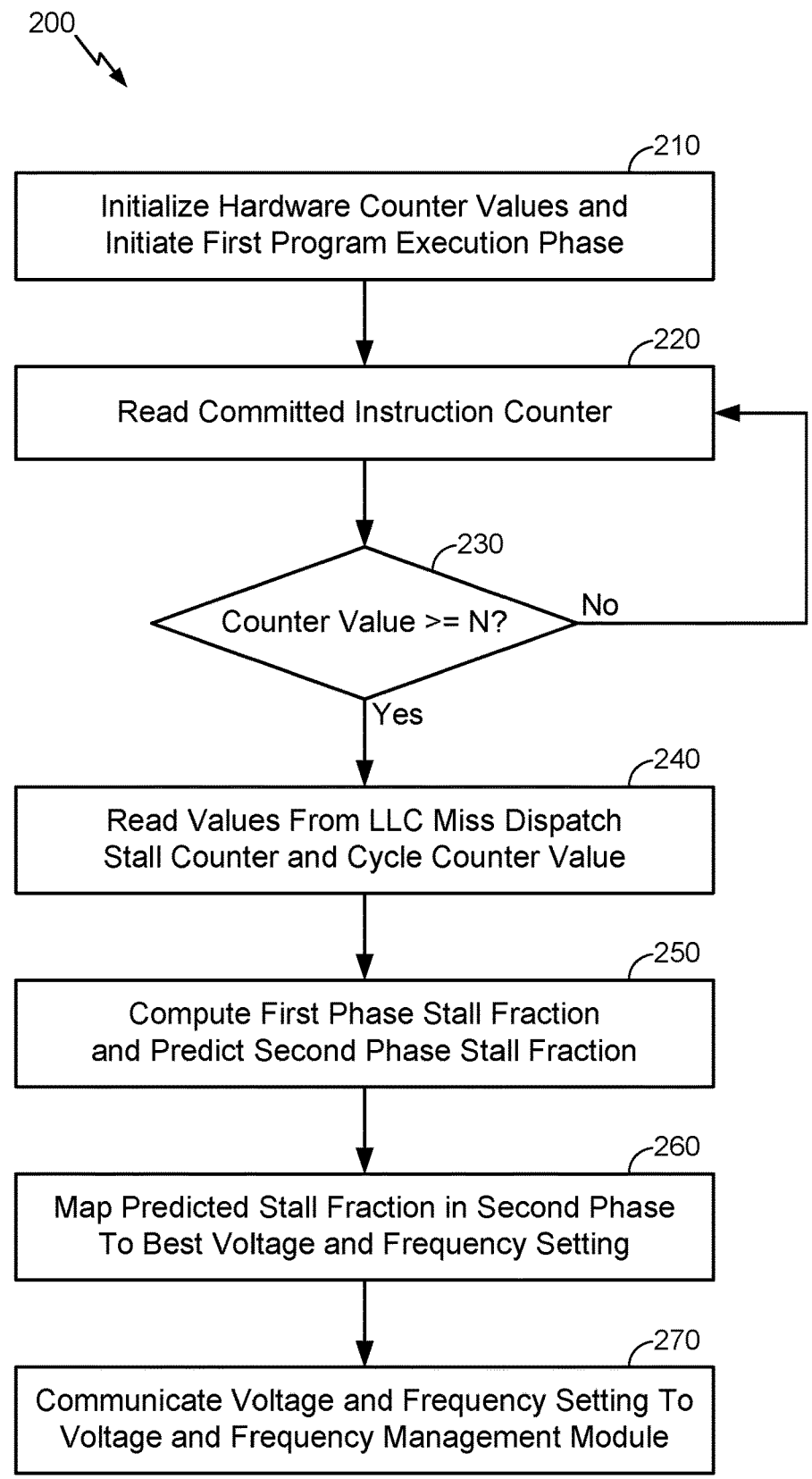
FIG. 2 illustrates an exemplary method to initialize a cooperative hardware and software/firmware mechanism used to scale clock frequency and voltage in a processor-based system according to program execution phase, according to various aspects.

According to various aspects, FIG. 2 illustrates an exemplary method 200 to initialize the cooperative hardware and software/firmware mechanism used to scale clock frequency and voltage in the processor-based system shown in FIG. 1 and described in further detail above. In particular, at block 210, values associated with the various hardware counters may be initialized (e.g., set to zero) and a first program execution phase may be initiated. For example, as described above in connection with FIG. 1, the hardware counters initialized at block 210 may comprise a last-level cache (LLC) miss dispatch stall counter that may be incremented in each cycle where (i) a dispatch stall occurs such that no instruction is dispatched to the execution lanes in the processor-based system and (ii) an oldest load instruction in a load queue is in a LLC miss state, wherein the oldest load instruction in the load queue may be in the LLC miss state for more than one cycle. In addition, the initialized hardware counters may comprise a cycle counter incremented in each processor cycle and a committed instruction counter incremented each time that an instruction is committed or retired. As such, according to various aspects, the hardware counters may provide visibility into underlying hardware behavior, including dispatch stalls that occur in cycles where an oldest instruction in the load queue is a LLC miss, total processor cycles, and total committed instructions during the first program execution phase.

In various embodiments, at block 220, a software/firmware mechanism may then read the committed instruction counter (e.g., in each cycle, on a periodic basis, etc.) and then determine whether the value read from committed instruction counter has reached a threshold value at block 230. For example, in various embodiments, the threshold value may comprise ten million committed instructions or another suitable value that provides a sufficient sampling window over which to assess whether the current program phase is memory-bound or compute-intensive. In response to determining that the value read from committed instruction counter has not reached the threshold value, the software/firmware mechanism may continue to read the committed instruction counter at block 220 until the value read from committed instruction counter has reached the threshold value. In response to determining that the value read from the instruction counter has reached the threshold value, as determined at block 230, the software/firmware mechanism may then further read the LLC miss dispatch stall counter and the cycle counter at block 240, at which time the hardware counters may each be reset to zero. As such, the value read from the LLC miss dispatch stall counter may indicate the stall behavior (or memory-boundedness) in the current program execution phase according to how many times a dispatch stall occurred in the presence of the oldest instruction in the load queue being a LLC miss over the total processor cycles needed to commit N instructions, where N represents the threshold value. In various embodiments, at block 250, the software/firmware may divide the value read from the LLC miss dispatch stall counter at block 240 according to the value read from the cycle counter at block 240 to compute a stall fraction in the first program phase, wherein the computed stall fraction may represent a percentage of the total cycles in which a dispatch stall occurred in the presence of the oldest instruction in the load queue being a LLC miss (i.e., a degree to which the first program phase was memory-bound due to the processor waiting on data from a memory subsystem without doing useful work). Accordingly, the software/firmware may further predict the stall fraction in a next (second) phase based on the computed stall fraction in the first program phase. In that sense, because the method 200 is described in relation to initializing the cooperative hardware and software/firmware mechanism in a first program execution phase, there may not be any predicted stall fraction computed in a prior phase. As such, in various embodiments, the predicted stall fraction in the second phase may be based solely on the computed stall fraction in the first program phase.

According to various aspects, in response to suitably predicting the stall fraction in the second program phase, the predicted stall fraction may be mapped to optimal clock frequency and voltage settings at block 260, wherein the optimal clock frequency and voltage settings mapped to the predicted stall fraction may best maximize power savings and minimize performance loss at the predicted stall fraction. The mapped voltage and frequency settings may then be communicated to a voltage and frequency management module at block 270, wherein the voltage and frequency management module may adjust a voltage supplied to the processor and a frequency at which clock pulses are supplied to the processors accordingly. The predicted stall fraction in the second program phase may then be stored and used to predict stall fractions in subsequent program phases, as described in further detail herein.

Figure 3:
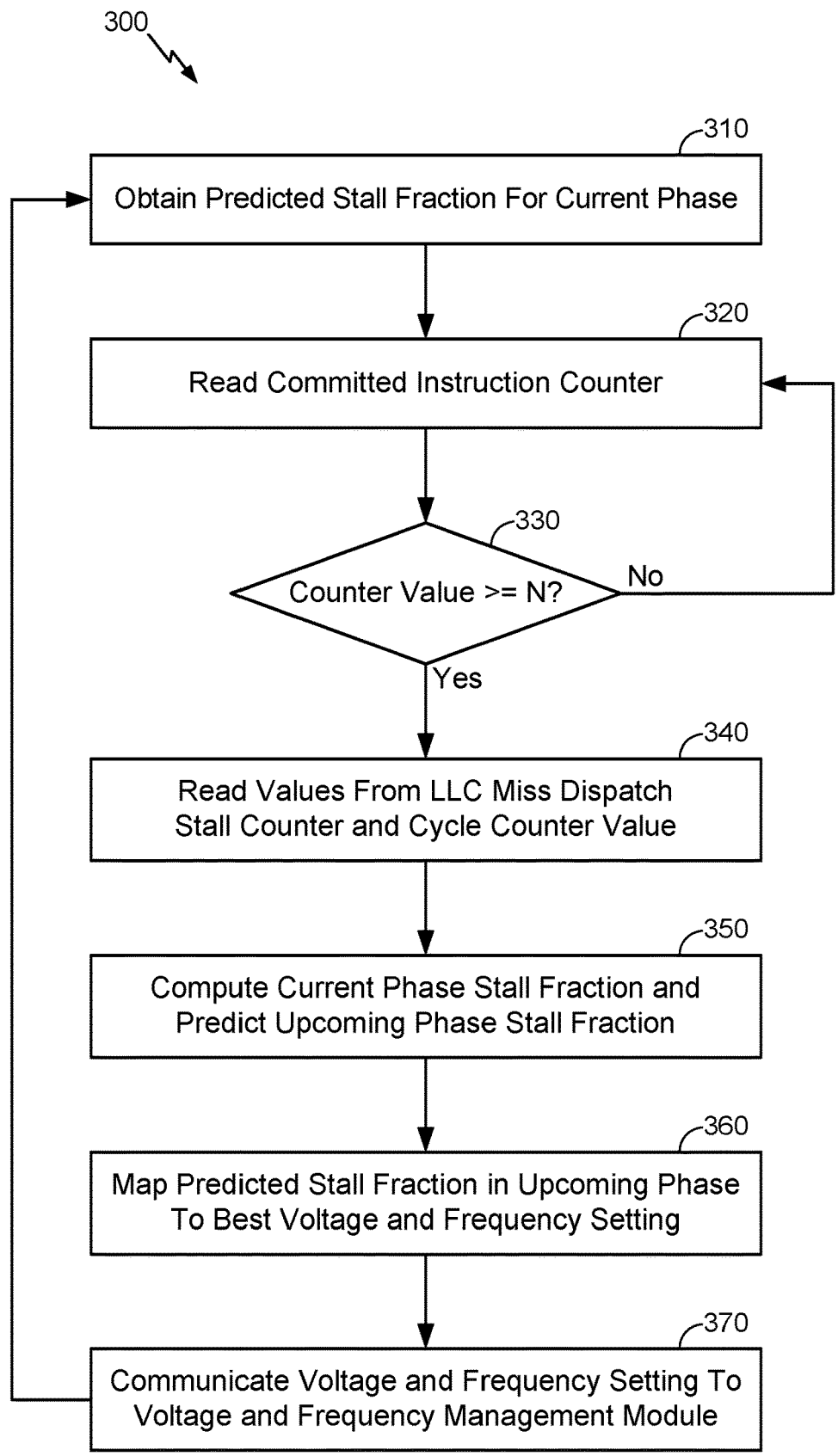
FIG. 3 illustrates an exemplary method to scale clock frequency and voltage according to whether a cooperative hardware and software/firmware mechanism predicts that an upcoming program execution phase will be a memory-bound program phase or a compute-intensive program phase, according to various aspects.

More particularly, according to various aspects, FIG. 3 illustrates an exemplary method 300 to scale clock frequency and voltage according to whether a cooperative hardware and software/firmware mechanism predicts that an upcoming program execution phase will be a memory-bound program phase or a compute-intensive program phase. For example, at block 310, a predicted stall fraction for the current phase may be obtained, wherein the predicted stall fraction for the current phase may have been computed in an immediately preceding phase. In various embodiments, the software/firmware may read the committed instruction counter at block 320 (e.g., in each cycle, on a periodic basis, etc.) and then determine whether the value read from committed instruction counter has reached the threshold value at block 330. In response to determining that the value read from committed instruction counter has not reached the threshold value, the software/firmware mechanism may continue to read the committed instruction counter at block 320 until the value read from committed instruction counter has reached the threshold value. Once the value read from the instruction counter reaches the threshold value, as determined at block 330, the software/firmware mechanism may then further read the LLC miss dispatch stall counter and the cycle counter at block 340, at which time the hardware counters may again be reset to zero. In various embodiments, at block 350, the software/firmware may divide the value read from the LLC miss dispatch stall counter at block 340 according to the value read from the cycle counter at block 340 to compute a stall fraction in the current program phase, wherein the computed stall fraction may represent a percentage of the total cycles during the current program phase in which a dispatch stall occurred in the presence of the oldest instruction in the load queue being a LLC miss. Accordingly, based on the predicted stall fraction for the current phase, as obtained at block 310, the stall fraction in a next (upcoming) phase may be predicted at block 350 based on the computed stall fraction in the current program phase and the predicted stall fraction for the current program phase, as calculated in the immediately preceding program phase. For example, in various embodiments, the predicted stall fraction in the next phase (PredStall$_{n+1}$) as calculated at block 350 may be based on an exponential weighted moving average that takes the predicted and computed stall fraction(s) in prior phases into account, which may be calculated according to the following formula:

$$\text{PredStall}_{n+1} = \alpha * \text{Stall}_n + (1-\alpha) * \text{PredStall}_n,$$

where $\alpha$ is a programmable and empirically determined constant, Stall$_n$ is the actual stall fraction in the current phase as computed at block 350, and PredStall$_n$ is the stall fraction that was predicted for the current phase and obtained at block 310.

According to various aspects, in response to suitably predicting the stall fraction in the next program phase, the predicted stall fraction may be mapped to optimal clock frequency and voltage settings at block 360, wherein the optimal clock frequency and voltage settings mapped to the predicted stall fraction may best maximize power savings and minimize performance loss at the predicted stall fraction. The mapped voltage and frequency settings may then be communicated to a voltage and frequency management module at block 370, wherein the voltage and frequency management module may adjust a voltage supplied to the processor and a frequency at which clock pulses are supplied to the processors accordingly. The method 300 may then return to block 310, where the predicted stall fraction in the next program phase (as computed at block 350) may be obtained and used to predict stall fractions in subsequent program phases in substantially the same manner described in further detail above.

According to various aspects, the cooperative hardware and software/firmware DCVS mechanisms and the corresponding methods described herein can be employed in any circuit, including but not limited to a microprocessor-based circuit, system, or others suitable electronic device. For example, electronic devices that can include or otherwise employ the cooperative hardware and software/firmware DCVS mechanisms described herein can comprise, without limitation, mobile phones, cellular phones, computers, portable computers, desktop computers, personal digital assistants (PDAs), monitors, computer monitors, televisions, tuners, radios, satellite radios, digital music players, portable music players, digital video players, digital video disc (DVD) players, portable digital video players, or the like.

Figure 4:
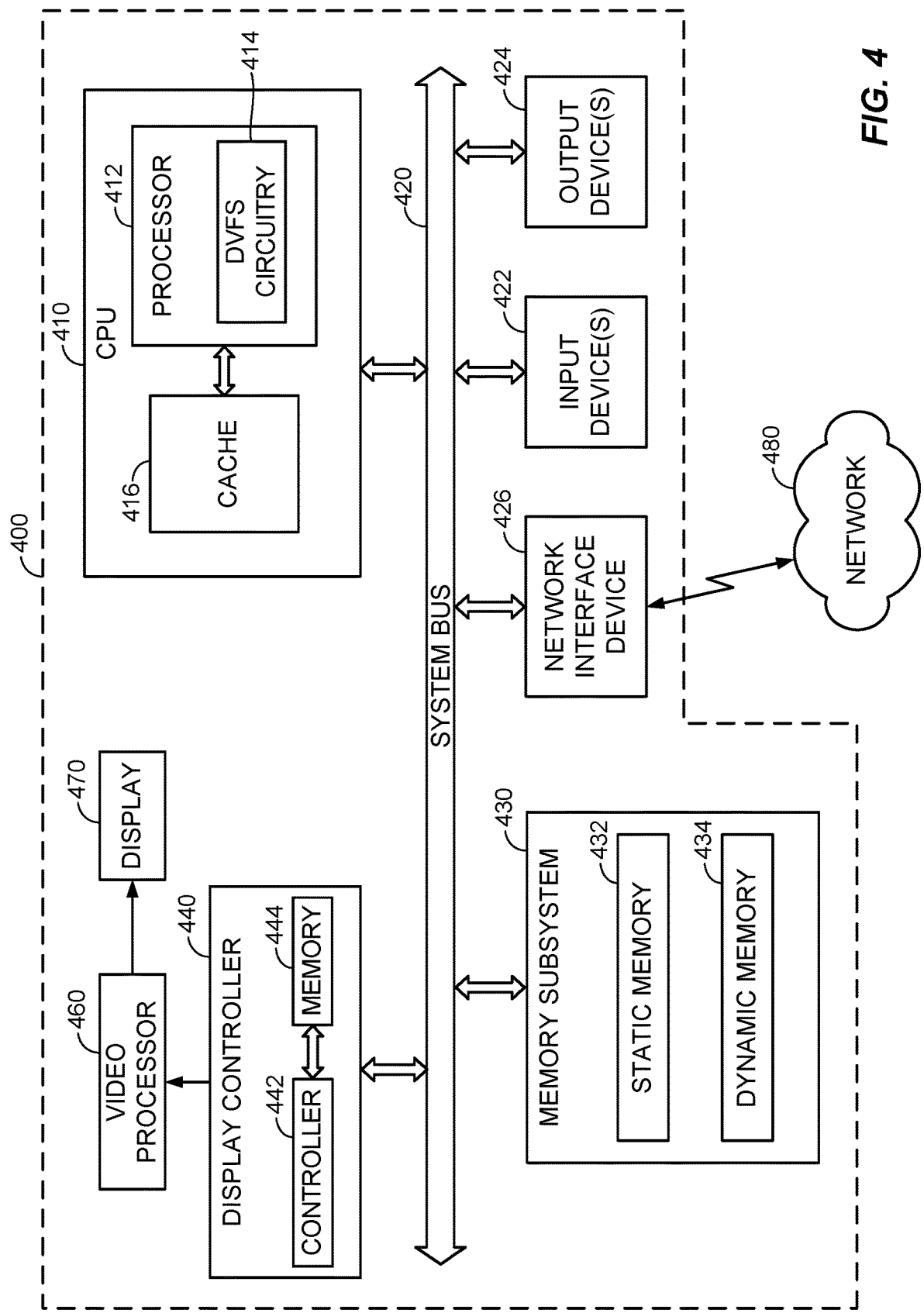
FIG. 4 illustrates an exemplary processor-based system that may implement the cooperative hardware and software/firmware DCVS mechanisms and corresponding methods described herein to scale clock frequency and voltage according to program execution phase, according to various aspects.

For example, according to various aspects, FIG. 4 illustrates an example processor-based system 400 that can employ the cooperative hardware and software/firmware DCVS mechanisms and corresponding methods described in further detail above with respect to FIG. 1 through FIG. 3. For example, the processor-based system 400 shown in FIG. 4 includes a central processing unit (CPU) 410 that includes a cache 416 and a processor 412, which may include DCVS circuitry 414 configured to implement the cooperative hardware and software/firmware DCVS mechanisms and corresponding methods described in further detail above. In particular, as described in further detail above with respect to FIG. 1 through FIG. 3, the DCVS circuitry 414 may include various hardware counters that can track statistics that may indicate a degree to which a current program execution phase is memory-bound and/or compute-intensive in addition to software/firmware that can predict memory-boundedness in upcoming program phases according to the statistics that are tracked using the various hardware counters. Furthermore, the DCVS circuitry 414 may comprise a voltage and frequency management module that can adjust a supply voltage on the CPU 410 and a frequency at which clock pulses are supplied to the CPU 410 based on desired voltage and frequency settings determined at the software/firmware according to a mapping between predicted stall fractions and optimal voltage and frequency settings at the predicted stall fractions.

According to various embodiments, the CPU 410 may be coupled to a system bus 420, which may intercouple various other devices included in the processor-based system 400. As will apparent to those skilled in the art, the CPU 410 may exchange address, control, and data information over the system bus 420 to communicate with the other devices included in the processor-based system 400, which can include suitable devices. For example, as illustrated in FIG. 4, the devices included in the processor-based system 400 can include a memory subsystem 430 that can include static memory 432 and/or dynamic memory 434, one or more input devices 422, one or more output devices 424, a network interface device 426, and a display controller 440. In various embodiments, the input devices 422 can include any suitable input device type, including but not limited to input keys, switches, voice processors, etc. The output devices 424 can similarly include any suitable output device type, including but not limited to audio, video, other visual indicators, etc. The network interface device 426 can be any device configured to allow exchange of data to and from a network 480, which may comprise any suitable network type, including but not limited to a wired or wireless network, private or public network, a local area network (LAN), a wide local area network (WLAN), and the Internet. The network interface device 426 can support any type of communication protocol desired. The CPU 410 can access the memory subsystem 430 over the system bus 420.

According to various embodiments, the CPU 410 can also access the display controller 440 over the system bus 420 to control information sent to a display 470. The display controller 440 can include a memory controller 442 and memory 444 to store data to be sent to the display 470 in response to communications with the CPU 410. The display controller 440 sends information to the display 470 to be displayed via a video processor 460, which processes the information to be displayed into a format suitable for the display 470. The display 470 can include any suitable display type, including but not limited to a cathode ray tube (CRT), a liquid crystal display (LCD), a plasma display, etc.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described above in connection with the various aspects and embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. For example, a general purpose processor may be a microprocessor, or in the alternative, the processor may be any conventional processor, controller, microcontroller, state machine, etc. The processor may also be implemented as a combination of computing devices (e.g., a combination of a DSP and a microprocessor, a plurality of microprocessors, one or more microprocessors in conjunction with a DSP core, or any other suitable configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications can be made without departing from the scope of the disclosure as defined by the appended claims. The functions, steps and/or actions of the method claims in accordance with the aspects and embodiments described herein need not be performed in any particular order. Furthermore, although elements may be described above or claimed in the singular, the plural is contemplated unless limitation to the singular is explicitly stated.

What is claimed is:

1. A method for dynamic clock and voltage scaling, comprising:
    configuring a polling interval for defining a current program execution phase;
    measuring a stall fraction for the current program execution phase according to the configured polling interval, wherein the measured stall fraction indicates a degree to which the current program execution phase was memory-bound due at least in part to a processor waiting on data from a memory subsystem and on a number of cycles during the current program execution phase in which a dispatch stall occurred;
    predicting a stall fraction for a next program execution phase based on the measured stall fraction for the current program execution phase in combination with a predicted stall fraction for the current program execution phase; and
    applying, by the processor, a frequency setting and a voltage setting for the next program execution phase based on the predicted stall fraction for the next program execution phase.

2. The method recited in claim 1, wherein the measured stall fraction further indicates the degree to which the current program execution phase was memory-bound due to the processor not performing useful work while waiting on the data from the memory subsystem.

3. The method recited in claim 1, wherein the stall fraction for the next program execution phase is predicted according to a moving average based on the measured stall fraction and the predicted stall fraction for the current program execution phase.

4. The method recited in claim 3, wherein the moving average is an exponential moving average calculated according to the formula:

$$PredStall_{n+1} = \alpha * Stall_n + (1-\alpha) * PredStall_n,$$

where $\alpha$ is a constant value, $Stall_n$ is the measured stall fraction for the current program execution phase, and $PredStall_n$ is the predicted stall fraction for the current program execution phase.

5. The method recited in claim 1, wherein the predicted stall fraction for the current program execution phase is calculated in a preceding program execution phase.

6. The method recited in claim 1, wherein the frequency setting and the voltage setting to be applied during the next program execution phase is mapped to the predicted stall fraction for the next program execution phase.

7. The method recited in claim 1, further comprising:
    comparing the predicted stall fraction for the next program execution phase to multiple different thresholds that correspond to different frequency and voltage setting combinations; and
    mapping the predicted stall fraction for the next program execution phase to one of the multiple different frequency and voltage setting combinations that has a maximum power savings, a minimum performance loss, or a combination thereof at the predicted stall fraction.

8. The method recited in claim 1, wherein the measured stall fraction indicates the degree to which the current program execution phase was memory-bound based at least in part on a number of cycles during the current program execution phase in which an oldest instruction in a load queue was a last-level cache miss.

9. The method recited in claim 1, wherein the measured stall fraction indicates the degree to which the current program execution phase was memory-bound based on a number of cycles during the current program execution phase in which a dispatch stall occurred while an oldest instruction in a load queue was a last-level cache miss.

10. An apparatus, comprising:
    a memory subsystem; and
    a processor coupled to the memory subsystem, the processor configured to:
        configure a polling interval for defining a current program execution phase;
        measure a stall fraction for the current program execution phase according to the configured polling interval, wherein the measured stall fraction indicates a degree to which the current program execution phase was memory-bound due at least in part to the processor waiting on data from the memory subsystem and on a number of cycles during the current program execution phase in which a dispatch stall occurred;

predict a stall fraction for a next program execution phase based on the measured stall fraction for the current program execution phase in combination with a predicted stall fraction for the current program execution phase; and apply a frequency setting and a voltage setting for the next program execution phase based on the predicted stall fraction for the next program execution phase.

11. The apparatus recited in claim 10, wherein the measured stall fraction further indicates the degree to which the current program execution phase was memory-bound due to the processor not performing useful work while waiting on the data from the memory subsystem.

12. The apparatus recited in claim 10, wherein the processor is configured to predict the stall fraction for the next program execution phase according to a moving average based on the measured stall fraction and the predicted stall fraction for the current program execution phase.

13. The apparatus recited in claim 12, wherein the moving average is an exponential moving average calculated according to the formula:

$$PredStall_{n+1} = \alpha * Stall_n + (1-\alpha) * PredStall_n,$$

where $\alpha$ is a constant value, $Stall_n$ is the measured stall fraction for the current program execution phase, and $PredStall_n$ is the predicted stall fraction for the current program execution phase.

14. The apparatus recited in claim 10, wherein the processor is further configured to calculate the predicted stall fraction for the current program execution phase in a preceding program execution phase.

15. The apparatus recited in claim 10, wherein the frequency setting and the voltage setting to be applied during the next program execution phase is mapped to the predicted stall fraction for the next program execution phase.

16. The apparatus recited in claim 10, wherein the processor is further configured to:

compare the predicted stall fraction for the next program execution phase to multiple different thresholds that correspond to different frequency and voltage setting combinations; and map the predicted stall fraction for the next program execution phase to one of the multiple different frequency and voltage setting combinations that has a maximum power savings, a minimum performance loss, or a combination thereof at the predicted stall fraction.

17. The apparatus recited in claim 10, wherein the measured stall fraction indicates the degree to which the current program execution phase was memory-bound based at least in part on a number of cycles during the current program execution phase in which an oldest instruction in a load queue was a last-level cache miss.

18. The apparatus recited in claim 10, wherein the measured stall fraction indicates the degree to which the current program execution phase was memory-bound based on a number of cycles during the current program execution phase in which a dispatch stall occurred while an oldest instruction in a load queue was a last-level cache miss.

19. An apparatus, comprising:

means for configuring a polling interval for defining a current program execution phase;

means for measuring a stall fraction for the current program execution phase according to the configured polling interval, wherein the measured stall fraction indicates a degree to which the current program execution phase was memory-bound due at least in part to a processor waiting on data from a memory subsystem and on a number of cycles during the current program execution phase in which a dispatch stall occurred;

means for predicting a stall fraction for a next program execution phase based on the measured stall fraction for the current program execution phase in combination with a predicted stall fraction for the current program execution phase; and means for applying a frequency setting and a voltage setting for the next program execution phase based on the predicted stall fraction for the next program execution phase.

20. The apparatus recited in claim 19, wherein the measured stall fraction further indicates the degree to which the current program execution phase was memory-bound due to the processor not performing useful work while waiting on the data from the memory subsystem.

21. The apparatus recited in claim 19, wherein the stall fraction for the next program execution phase is predicted according to a moving average based on the measured stall fraction and the predicted stall fraction for the current program execution phase.

22. The apparatus recited in claim 21, wherein the moving average is an exponential moving average calculated according to the formula:

$$PredStall_{n+1} = \alpha * Stall_n + (1-\alpha) * PredStall_n,$$

where $\alpha$ is a constant value, $Stall_n$ is the measured stall fraction for the current program execution phase, and $PredStall_n$ is the predicted stall fraction for the current program execution phase.

23. The apparatus recited in claim 19, wherein the predicted stall fraction for the current program execution phase is calculated in a preceding program execution phase.

24. The apparatus recited in claim 19, wherein the frequency setting and the voltage setting to be applied during the next program execution phase is mapped to the predicted stall fraction for the next program execution phase.

25. The apparatus recited in claim 19, further comprising:

means for comparing the predicted stall fraction for the next program execution phase to multiple different thresholds that correspond to different frequency and voltage setting combinations; and means for mapping the predicted stall fraction for the next program execution phase to one of the multiple different frequency and voltage setting combinations that has a maximum power savings, a minimum performance loss, or a combination thereof at the predicted stall fraction.

26. The apparatus recited in claim 19, wherein the measured stall fraction indicates the degree to which the current program execution phase was memory-bound based at least in part on a number of cycles during the current program execution phase in which an oldest instruction in a load queue was a last-level cache miss.

27. The apparatus recited in claim 19, wherein the measured stall fraction indicates the degree to which the current program execution phase was memory-bound based on a number of cycles during the current program execution phase in which a dispatch stall occurred while an oldest instruction in a load queue was a last-level cache miss.

28. A non-transitory computer-readable medium, wherein the non-transitory computer-readable medium comprises code for causing a processor to:

configure a polling interval for defining a current program execution phase;

measure a stall fraction for the current program execution phase according to the configured polling interval, wherein the measured stall fraction indicates a degree to which the current program execution phase was memory-bound due at least in part to the processor waiting on data from a memory subsystem and on a number of cycles during the current program execution phase in which a dispatch stall occurred;

predict a stall fraction for a next program execution phase based on the measured stall fraction for the current program execution phase in combination with a predicted stall fraction for the current program execution phase; and apply a frequency setting and a voltage setting for the next program execution phase based on the predicted stall fraction for the next program execution phase.

29. The non-transitory computer-readable medium recited in claim 28, wherein the measured stall fraction further indicates the degree to which the current program execution phase was memory-bound due to the processor not performing useful work while waiting on the data from the memory subsystem.

30. The non-transitory computer-readable medium recited in claim 28, wherein the stall fraction for the next program execution phase is predicted according to a moving average based on the measured stall fraction and the predicted stall fraction for the current program execution phase.

31. The non-transitory computer-readable medium recited in claim 30, wherein the moving average is an exponential moving average calculated according to the formula:

$$PredStall_{n+1} = \alpha * Stall_n + (1-\alpha) * PredStall_n,$$

where $\alpha$ is a constant value, $Stall_n$ is the measured stall fraction for the current program execution phase, and $PredStall_n$ is the predicted stall fraction for the current program execution phase.

32. The non-transitory computer-readable medium recited in claim 28, wherein the predicted stall fraction for the current program execution phase is calculated in a preceding program execution phase.

33. The non-transitory computer-readable medium recited in claim 28, wherein the frequency setting and the voltage setting to be applied during the next program execution phase is mapped to the predicted stall fraction for the next program execution phase.

34. The non-transitory computer-readable medium recited in claim 28, further comprising code for causing the processor to:

compare the predicted stall fraction for the next program execution phase to multiple different thresholds that correspond to different frequency and voltage setting combinations; and map the predicted stall fraction for the next program execution phase to one of the multiple different frequency and voltage setting combinations that has a maximum power savings, a minimum performance loss, or a combination thereof at the predicted stall fraction.

35. The non-transitory computer-readable medium recited in claim 28, wherein the measured stall fraction indicates the degree to which the current program execution phase was memory-bound based at least in part on a number of cycles during the current program execution phase in which an oldest instruction in a load queue was a last-level cache miss.

36. The non-transitory computer-readable medium recited in claim 28, wherein the measured stall fraction indicates the degree to which the current program execution phase was memory-bound based on a number of cycles during the current program execution phase in which a dispatch stall occurred while an oldest instruction in a load queue was a last-level cache miss.

* * * * *